(12) United States Patent
Habermas et al.

(10) Patent No.: US 11,305,397 B2
(45) Date of Patent: Apr. 19, 2022

(54) LAPPING SYSTEM THAT INCLUDES A LAPPING PLATE TEMPERATURE CONTROL SYSTEM, AND RELATED METHODS

(71) Applicant: Seagate Technology LLC, Cupertino, CA (US)

(72) Inventors: Andrew Habermas, Bloomington, MN (US); Dat Quach, Savage, MN (US); Jeff O'Konski, Savage, MN (US); Yuhong Xiong, Maple Grove, MN (US); Ricky Anderson, Bloomington, MN (US); Joshua Zierhut, Minneapolis, MN (US)

(73) Assignee: Seagate Technology LLC, Fremont, CA (US)

( * ) Notice: Subject to any disclaimer, the term of this patent is extended or adjusted under 35 U.S.C. 154(b) by 281 days.

(21) Appl. No.: 16/430,540

(22) Filed: Jun. 4, 2019

(65) Prior Publication Data
US 2019/0381628 A1    Dec. 19, 2019

Related U.S. Application Data

(60) Provisional application No. 62/686,417, filed on Jun. 18, 2018.

(51) Int. Cl.
*B24B 37/015*   (2012.01)
*B24B 37/04*    (2012.01)
(Continued)

(52) U.S. Cl.
CPC .......... *B24B 37/048* (2013.01); *B24B 37/015* (2013.01); *B24B 37/10* (2013.01); *G11B 5/3163* (2013.01); *G11B 5/6005* (2013.01)

(58) Field of Classification Search
None
See application file for complete search history.

(56) References Cited

U.S. PATENT DOCUMENTS 4,098,032 A      7/1978   Olbert
5,365,700 A  *  11/1994   Sawada ................. B24B 37/048
                                                              451/28
(Continued)

FOREIGN PATENT DOCUMENTS

CN          1230014 A       9/1999
CN          1538387 A      10/2004
(Continued)

OTHER PUBLICATIONS

First Chinese Office Action, and English Translation thereof, for Chinese Counterpart Application No. 201910525089.6, dated Feb. 8, 2021, (20 pages).

(Continued)

*Primary Examiner* — Jefferson A Evans
(74) *Attorney, Agent, or Firm* — Kagan Binder, PLLC

(57) ABSTRACT

The present disclosure includes a lapping system that includes a temperature control system system to heat or cool the lapping plate while lapping. The temperature control system can include a closed circuit fluid system and/or one or more electrical resistive heating elements. In some embodiments that cooling system can control the temperature of the lapping plate during lapping to within +/−5° C., or even +/−0.5° C.

19 Claims, 6 Drawing Sheets

(51) Int. Cl.
*G11B 5/31* (2006.01)
*G11B 5/60* (2006.01)
*B24B 37/10* (2012.01)

(56) References Cited

U.S. PATENT DOCUMENTS

| | | | |
|---|---|---|---|
| 6,217,425 B1* | 4/2001 | Shindou | B24B 37/00 451/259 |
| 6,679,762 B2 | 1/2004 | Fatula, Jr. et al. | |
| 6,722,947 B2* | 4/2004 | Nishioka | B24B 37/00 29/603.16 |
| 6,857,937 B2 | 2/2005 | Bajorek | |
| 6,942,544 B2* | 9/2005 | Beaucage | B24B 37/042 451/41 |
| 7,040,963 B1* | 5/2006 | Okuda | B24B 37/015 451/28 |
| 7,551,406 B1 | 6/2009 | Thomas et al. | |
| 7,643,250 B2 | 1/2010 | Araki et al. | |
| 7,804,686 B2* | 9/2010 | Parish | H05K 7/20772 361/696 |
| 7,911,736 B2 | 3/2011 | Bajorek | |
| 8,165,709 B1 | 4/2012 | Rudy | |
| 8,439,723 B2* | 5/2013 | Marks | B24B 37/015 451/7 |
| 8,638,349 B1 | 1/2014 | Liu et al. | |
| 8,810,947 B1 | 8/2014 | Ren et al. | |
| 8,845,391 B2* | 9/2014 | Sone | B24B 37/015 451/7 |
| 9,153,260 B1 | 10/2015 | Rudy et al. | |
| 9,776,299 B2 | 10/2017 | Herendeen | |
| 10,486,283 B2* | 11/2019 | Lueng | B24B 37/048 |
| 10,493,591 B1 | 12/2019 | Kunkel et al. | |
| 10,821,572 B2* | 11/2020 | Jeong | B24B 49/14 |
| 11,007,621 B2* | 5/2021 | Sotozaki | B24B 55/02 |
| 11,103,970 B2* | 8/2021 | Huang | B24B 49/14 |
| 2002/0052172 A1* | 5/2002 | Nishioka | B24B 53/017 451/41 |
| 2003/0065992 A1 | 4/2003 | Yang | |
| 2004/0209546 A1* | 10/2004 | Nishioka | B24B 49/00 451/5 |
| 2005/0070207 A1* | 3/2005 | Beaucage | B24B 37/042 451/5 |
| 2005/0070208 A1* | 3/2005 | Beaucage | B24B 49/14 451/5 |
| 2005/0164607 A1 | 7/2005 | Bajorek | |
| 2006/0168798 A1 | 8/2006 | Naka | |
| 2006/0232885 A1* | 10/2006 | Heng | G11B 5/6005 360/235.7 |
| 2007/0109686 A1 | 5/2007 | Jose et al. | |
| 2009/0052079 A1* | 2/2009 | Iwasa | G11B 5/102 360/67 |
| 2010/0208391 A1 | 8/2010 | Gokemeijer | |
| 2013/0070371 A1* | 3/2013 | Childress | G11B 5/6082 360/235.4 |
| 2013/0219699 A1* | 8/2013 | Lueng | B24B 37/048 29/603.16 |
| 2015/0258655 A1 | 9/2015 | Koon et al. | |
| 2017/0304987 A1 | 10/2017 | Lueng et al. | |
| 2019/0381629 A1* | 12/2019 | Rejda | B24B 37/048 |

FOREIGN PATENT DOCUMENTS

| | | |
|---|---|---|
| CN | 101474771 A | 7/2009 |
| CN | 202462200 U | 10/2012 |
| JP | 2000024892 A | 1/2000 |
| JP | 2013098183 A | 5/2013 |

OTHER PUBLICATIONS

Unpublished Utility U.S. Appl. No. 16/434,853, filed Jun. 7, 2019 (no attachment).
10 Glycol Tips for Water Chiller Operators, retrieved from 'https://coolingbestpractices.com/technology/cooling-towers/10-glycol-tips-water-chiller-operators', on Apr. 26, 2018, (2 pages).
What is Glycol? How is it Used in a Chiller?, retrieved from 'https://www.jcyounger.com/glycol-chiller/', on Apr. 26, 2018, (5 pages).

* cited by examiner

LAPPING SYSTEM THAT INCLUDES A LAPPING PLATE TEMPERATURE CONTROL SYSTEM, AND RELATED METHODS

RELATED APPLICATION

The present nonprovisional patent application claims the benefit of commonly owned provisional Applications having Ser. No. 62/686,417, filed on Jun. 18, 2018, which provisional Applications is incorporated herein by reference in its entirety.

BACKGROUND

The present disclosure relates to systems and methods for lapping row bars of sliders that can be used in data storage systems such as hard disk drives.

SUMMARY

Embodiments of the present disclosure include a method of lapping a slider or row bar having a plurality of sliders, wherein the method includes:
 a) lapping the slider or the row bar having a plurality of sliders by contacting a surface of the slider or row bar having a plurality of sliders with a rotating lapping plate;
 b) controlling the temperature of the lapping plate to a target temperature during at least a portion of the lapping.

Embodiments of the present disclosure also include a lapping system comprising:
 a) a mounting structure that can removably couple a row bar comprising a plurality of sliders,
 b) a lapping plate having a lapping surface that is operable to rotate and contact the row bar for lapping each slider; and
 c) a temperature control system operatively coupled to the lapping plate and configured to control the temperature of the lapping plate to a target temperature during at least a portion of the lapping.

DETAILED DESCRIPTION

Lapping machines (apparatuses) can be used to perform lapping operations on various substrates such as a row bar of sliders, which can ultimately be used to perform read/write operations in a hard disk drive using a transducer ("head"). Such lapping machines can use a lapping plate that performs grinding and/or polishing operations on a substrate such as a row bar of sliders. Lapping machines can include a rotating lapping plate that defines a lapping surface which can help abrase the surface of a row bar. Row bars can include a variety of materials such as magnetic material for transducer elements and ceramic material for the bulk of the slider body such as AlTiC, which is a two phase composite of alumina ($Al_2O_3$) and titanium-carbide (TiC). Each slider in a row bar can include a transducer region that includes, e.g., at least one magnetoresistive reader element, at least one magnetoresistive writer element, and at least one contact pad.

If desired, a slurry can be applied to the lapping surface to enhance the abrasing action as the lapping surface is rotated relative to a row bar containing a plurality of the sliders held in a pressing engagement against the lapping surface. A lapping plate can be used for a variety of lapping processes such as rough lapping, fine lapping, and kiss lapping. Lapping sliders is also described in U.S. Pub. No. 2013/0219699 (Lueng et al.), wherein the entirety of said patent document is incorporated herein by reference.

Figure 1A:
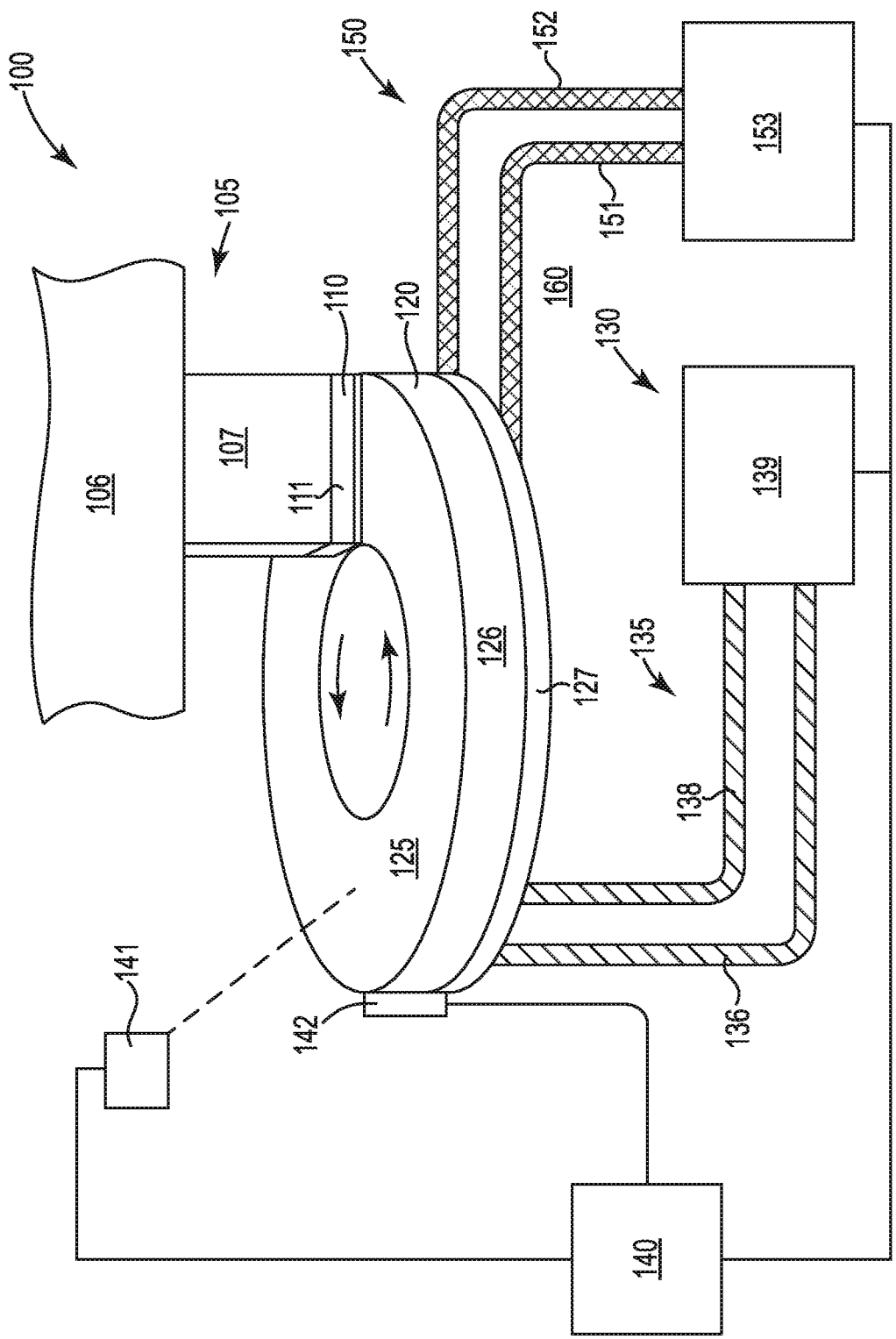
FIG. 1A is a schematic, elevation view showing portions of a lapping plate temperature control system according to the present disclosure for lapping a row bar of sliders.

Embodiments of the present disclosure include systems and methods for controlling the temperature of the lapping plate during lapping. For illustration purposes, an example of a system according to the present disclosure is described herein below with respect to FIGS. 1A and 1B. FIG. 1A shows a lapping system 100 that includes a mounting structure 105 that can removably couple a row bar 110. Row bar includes a plurality of individual sliders 111 that can ultimately be used in a hard disk drive. In some embodiments, a row bar can include at least 30 sliders, at least 60 sliders, or even at least 70 sliders. As shown in FIG. 1A, the mounting structure 105 includes an arm structure 106 and a carrier 107 that is removably attached to the arm structure 106. The row bar 110 is also removably attached to the carrier 107.

Lapping system 100 also includes lapping plate 120 mounted on a rotatable plate chuck 127 so that the lapping plate 120 can rotate, e.g., in the direction indicated by the arrows. A lapping plate 120 can be mounted on chuck 127 in any desirable manner. Examples include: using locating pins on chuck 127 and associated recesses in lapping plate 120; relying on the weight of plate 120 to hold it in place on chuck; clamps; vacuum; combinations of these and the like.

Lapping plate 120 has a lapping surface 125 that is operable to rotate and contact the row bar 110 for lapping each slider 111.

A lapping plate can be made of a wide variety of materials. In some embodiments, a lapping plate can be made of one or more metallic alloys, which can provide mechanical strength to help provide desirable flatness and prevent deformation. While surface 125 can be an abrasive surface made of abrasive particles and a coating material to adhere the abrasive particle to the lapping plate 120, at least the bulk of the lapping plate 120 can be made of a material that has a relatively high thermal conductivity so as to facilitate transfer heat to or from the temperature control system described below. In some embodiments, that lapping plate 120 can be made of material that has a thermal conductivity of 10 W/(m*K) or more. Non-limiting examples of such materials include tin, tin alloys, aluminum, copper, combinations of these, and the like.

An abrasive coating can be provided on a lapping plate 120 to form lapping surface 125. An abrasive coating can include a plurality of abrasive particles such as diamond particles, cubic boron nitride particles, alumina particles, alumina zirconia particles, silicon carbide particles, and combinations thereof.

Lapping plate 120 can have a wide variety of diameters and thicknesses. In some embodiments, lapping plate 120 can have an outer diameter in the range from 10 to 20 inches. In some embodiments, lapping plate 120 can have a thickness in the range from 0.5 to 5 inches. As shown in FIG. 1A, lapping plate 120 is relatively much larger in size and mass than row bar 110. Controlling the temperature of lapping plate 120 to within tolerances described herein can allow lapping plate 120 to function as a heat sink or heat source that permits controlling the temperature of row bar to within such tolerances in a relatively easy manner.

A lapping system according to the present disclosure can include a cooling system and/or a heating system to help control the temperature of at least the lapping surface of the lapping plate and avoid one or more undue consequences of unintended temperature variations.

For example, under-lapping of an element (e.g., writer, reader, and the like) in a slider to an undue degree can occur because an element's associated electronic lapping guide (ELG) may be at an unintended, elevated temperature due to one or more of the surrounding environment, and frictional heating due to contact during lapping between a row bar and a rotating lapping plate. An ELG is a thin metal resistor that has an electrical resistance that can change as conditions change. For example, the electrical resistance of an ELG can increase as ELG material is removed during a lapping process and thus may be used to monitor lapping of an associated element (e.g., writer, reader, and the like) during slider manufacturing. Accordingly, an ELG may be formed as part of a slider and the ELG resistance may be monitored during lapping. The resistance of an ELG can be correlated to material removed from an element that the ELG is associated with such as a magnetic reader, magnetic writer, and/or a near-field transducer. Thus, the ELG can be used to target a desired dimension of the magnetic reader, writer, or near-field transducer. For example, an ELG can be used during lapping to target a height value for a magnetic reader (e.g. "stripe height") and another ELG can be used during lapping to target a height value for a magnetic writer (e.g., "break point").

An increase in temperature can increase the resistance detected in an ELG, which can indicate an incorrect amount of material that is lapped away from the ELG and corresponding element. For example, Table 1 below illustrates that 1° C. temperature error can change the resistance of an ELG in a manner that correlates to 0.1-2.0 nanometers of material removal. The change in resistance of an ELG can be calculated according to $\Delta R = \alpha * R_o * \Delta T$, where R is the resistance of ELG material, $\alpha$ is the temperature coefficient of resistance of the ELG material, $R_o$ is the ideal resistance of the ELG material, and T is temperature of the ELG material.

TABLE 1

Impact of Temperature Change on ELG Resistance

| ELG | Metal | α-temperature coefficient of resistance | Nanometers/° C. |
| --- | --- | --- | --- |
| ELG Type 1 | Ruthenium | 0.0041 | 1.3 |
| ELG Type 2 | Chromium | 0.0030 | 0.8 |
| ELG Type 3 | Cobalt/Iron | 0.0043 | 1.4 |

Advantageously, by controlling the temperature of the lapping plate according to the present disclosure, the impact of heating (e.g., local heating) of ELGs can be reduced or substantially eliminated such that undue impact of elevated temperature on measured ELG resistance can be avoided. Accordingly, the measured resistance of an ELG can more closely correlate to a how much material has been lapped from a corresponding element such as a magnetic reader, magnetic writer, and/or a near-field transducer. Using ELGs during lapping is also described in U.S. Pat. No. 7,551,406 (Thomas et al.), U.S. Pat. No. 7,643,250 (Araki et al.), U.S. Pat. No. 8,165,709 (Rudy), 2006/0168798 (Naka), and 2010/0208391 (Gokemeijer), wherein there entireties of said patent documents are incorporated herein by reference for all purposes.

In some embodiments, lapping a row bar of sliders with a temperature control system according to the present disclosure can be performed where at least one slider in a row bar includes a reader ELG made of material selected from the group consisting of ruthenium, chromium, tantalum, cobalt, nickel, iron, and combinations thereof; and/or a writer ELG made of material selected from the group consisting of ruthenium, chromium, tantalum cobalt, nickel, iron, and combinations thereof. In some embodiments, the temperature control system can control the temperature of the lapping plate to a target temperature +/−0.3° C. By controlling at least the lapping surface of the lapping plate within such tolerances can help the lapping plate function as a heat sink because the lapping plate is relatively larger in area and mass as compared to a row bar and can help control the row bar (and its components) temperature to the lapping plate target temperature within relatively tight tolerances as well.

As another example, one or more elements in a slider can have different coefficients of thermal expansion and unintended heating (localized or across a whole row bar) can cause one or more elements to expand in the lapping direction to an undue degree such that more material is removed during lapping than desired. Similarly, unintended cooling on a bar can cause reduced lapping of elements relative to one another. For slider elements having relatively high coefficients of thermal expansion (e.g., contact pad, magnetoresistive reader element, magnetoresistive writer element, reader ELG, writer ELG, and combinations thereof), unintended heating, including localized heating, during lapping can cause such features to expand relatively more during lapping than other features having lower coefficients of thermal expansion. As a result more material may be removed from such elements than intended. After the element cools down, the element can contract and recede further than intended. Controlling the temperature of a lapping plate according to the present disclosure can help reduce or eliminate such unwanted recessions.

In more detail, for illustration purposes, FIGS. 2A-2D show how an unintended increase in temperature during kiss lapping can impact the amount of material that is removed from transducer elements having relatively higher coefficients of thermal expansion (CTE).

As used herein, the direction along x-axis (into the page of FIGS. 2A-2D) is referred to as the cross-track axis. The direction along the z-axis is referred to herein as the down-track axis, with reference to trailing edge 256. The direction along the y-axis is referred herein as the lapping direction (direction of material removal). For ease of illustration, the lapping plate 260 is not shown in contact with row bar during lapping in FIGS. 2B and 2C.

Figure 2A:
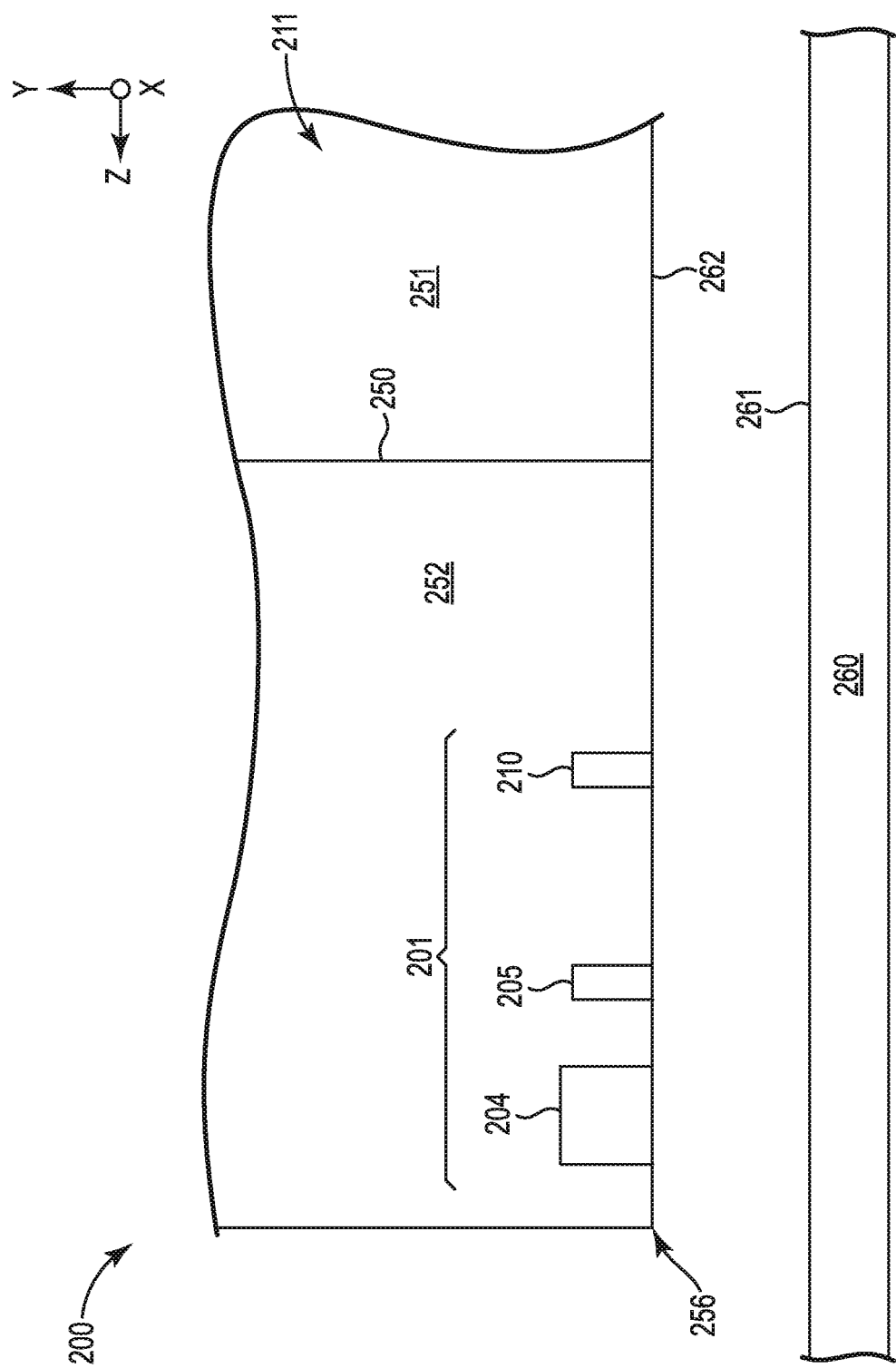
FIG. 2A is a schematic, cross-section of a row bar showing an individual slider before a kiss lapping procedure.

As shown in FIG. 2A, one slider 211 of a plurality of sliders in row bar 200 is illustrated. Slider 211 includes a transducer region 201 having at least a magnetoresistive writer element 205, a magnetoresistive reader element 210, and a contact pad 204. In some embodiments, a row bar according to the present disclosure can include at least 30 sliders, at least 60 sliders, or even at least 70 sliders. A slider according to the present disclosure can be mostly made out of ceramic material. As shown in FIG. 2A slider 211 includes an "AlTiC break" 250. The area 251 to the right of break 250, the bulk of the material is alumina titanium-carbide (also referred to as AlTiC), which can have an average CTE of $6.0 \times 10^{-6}/°$ C. The area 252 to the left of break 250, the bulk of the material, with the exception of many of the features in the transducer region 201, is alumina, which can have average CTE of $5.8 \times 10^{-6}/°$ C. Elements such as magnetoresistive writer element 205 are made of magnetic materials such cobalt-iron (CoFe), nickel-iron (NiFe), and the like. For example, in some embodiments, contact pad 204 can be made out of an alloy that includes 45 percent by weight of nickel and 55 percent of iron. Such a material can have an average CTE of $7.0 \times 10^{-6}/°$ C. As shown in FIG. 2A, before kiss lapping when row bar 211 is at a desired reference temperature (e.g., the ambient target temperature for lapping area), the bottom surfaces of the contact pad 204, magnetoresistive writer element 205, and magnetoresistive reader element 210 are coplanar with air bearing surface 262. Contact pad 204 recession is a topography measure of contact pad relative to AlTiC. CTE deltas between materials can result in contact pad recession sensitivity to temperature errors on the order of 0.1-2.0 A/° C.

Figure 2B:
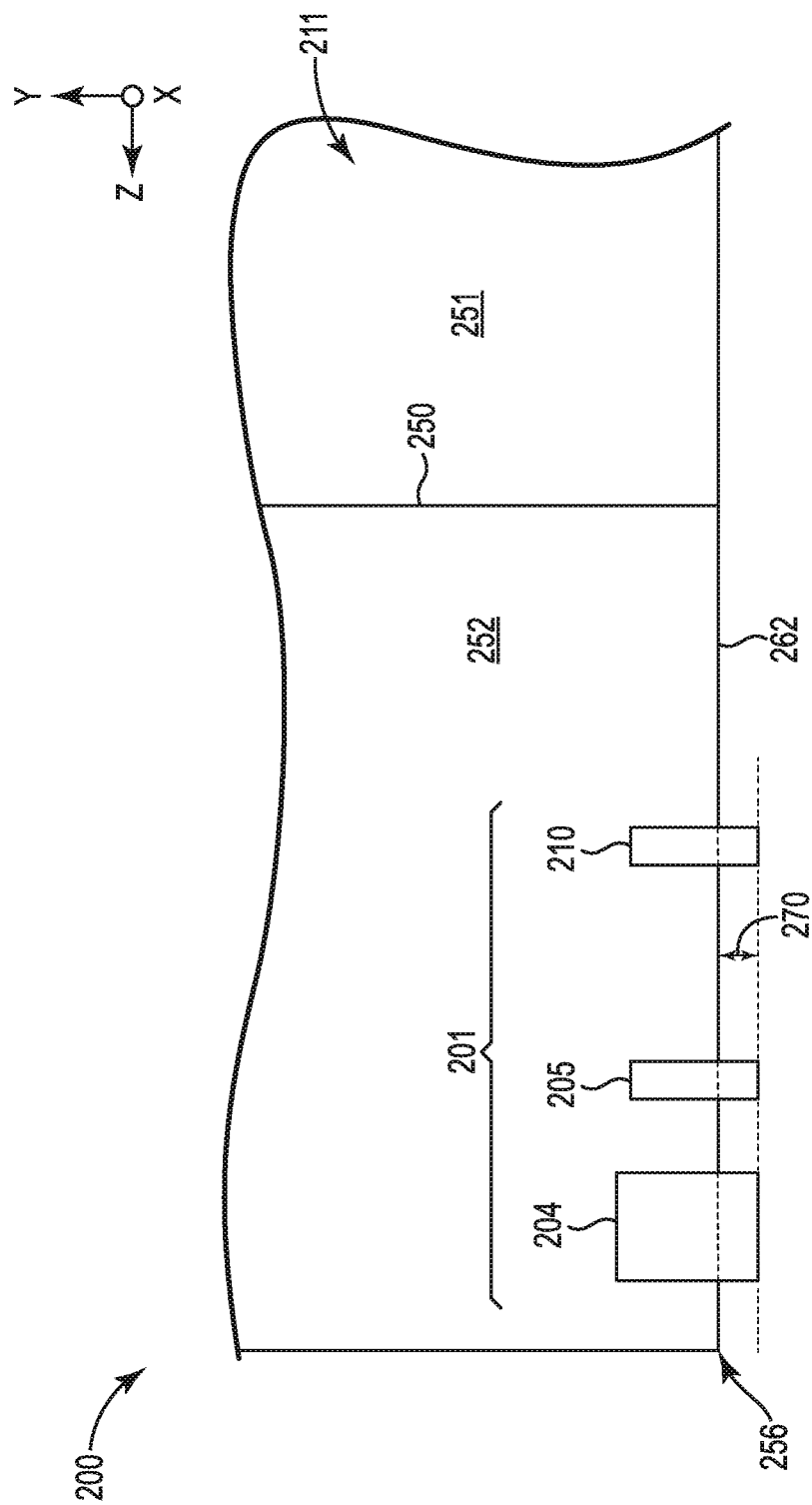
FIG. 2B is a schematic, cross-section of a row bar showing an individual slider during kiss lapping as the slider in FIG. 2A increases in temperature.

As shown in FIG. 2B, if the temperature of slider 211 increases during kiss lapping, the contact pad 204, magnetoresistive writer element 205, and magnetoresistive reader element 210 can expand relative to the alumina 252 and AlTiC 251 in the lapping direction "y" by a distance 270. It is noted that a single distance 270 is shown for ease of illustration, but contact pad 204, magnetoresistive writer element 205, and magnetoresistive reader element 210 could each expand a different amount. The temperature increase of a slider during kiss lapping could be due to frictional interactions with lapping plate; could be due to ambient temperature fluctuating above ambient target; and/or other mechanisms.

Figure 2C:
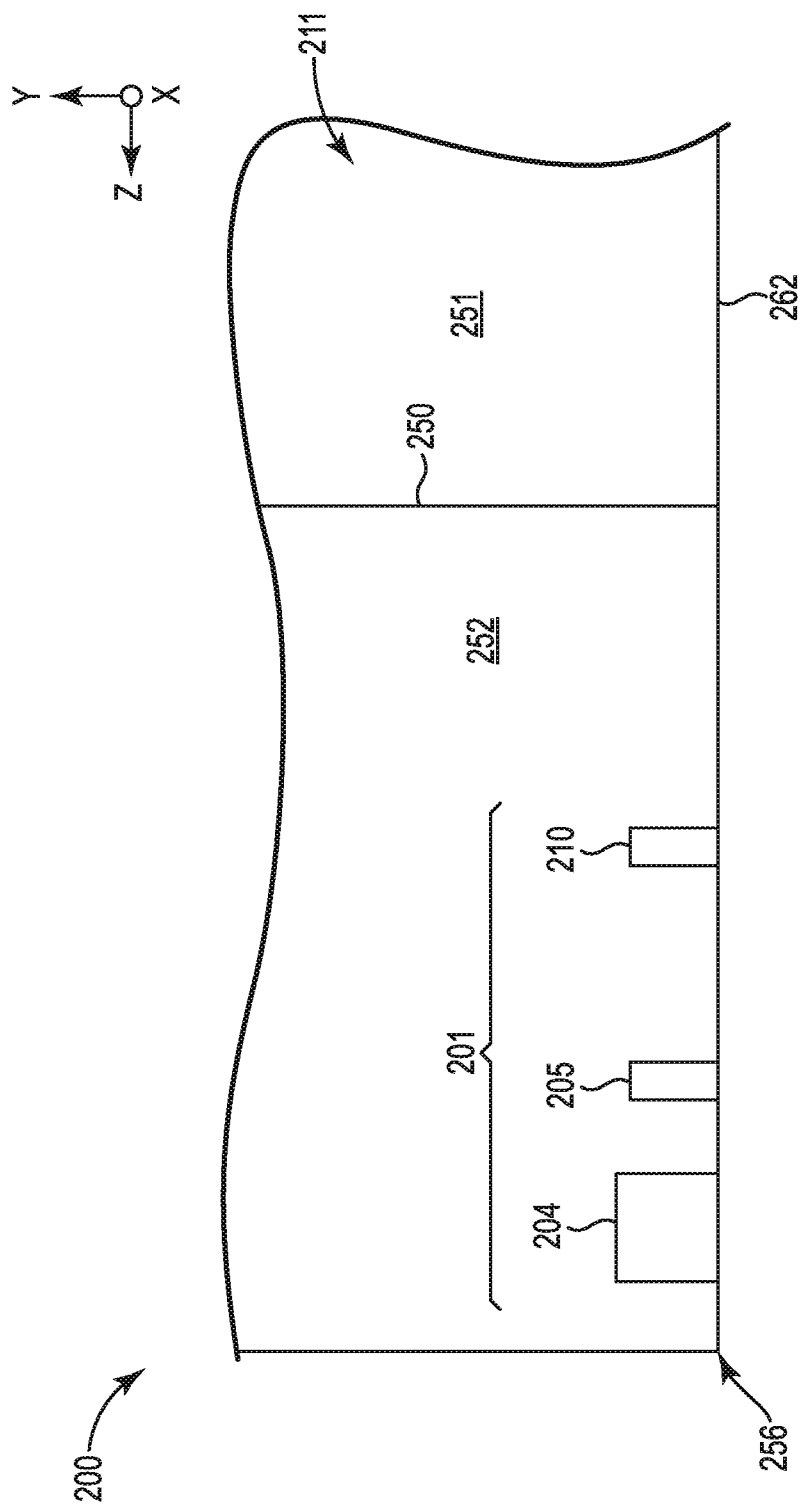
FIG. 2C is a schematic, cross-section of a row bar showing an individual slider during kiss lapping after lapping the slider shown in FIG. 2B.

When row bar 200 is caused to contact the rotating surface 261 of lapping plate 260, the expanded portions of contact pad 204, magnetoresistive writer element 205, and magnetoresistive reader element 210 can be removed so that the bottom surfaces of contact pad 205, magnetoresistive writer element 205, and magnetoresistive reader element 210 are coplanar with air bearing surface 262 as shown in FIG. 2C.

After lapping, when the row bar is relatively cooler (e.g., at or near drive operating temperature) the bottom surfaces of contact pad 204, magnetoresistive writer element 205, and magnetoresistive reader element 210 recede relative to the air bearing surface 262 in the lapping direction "y" by a distance 271. Again, it is noted that a single distance 271 is shown for ease of illustration, but contact pad 204, magnetoresistive writer element 205, and magnetoresistive reader element 210 could each recede a different amount.

Figure 2D:
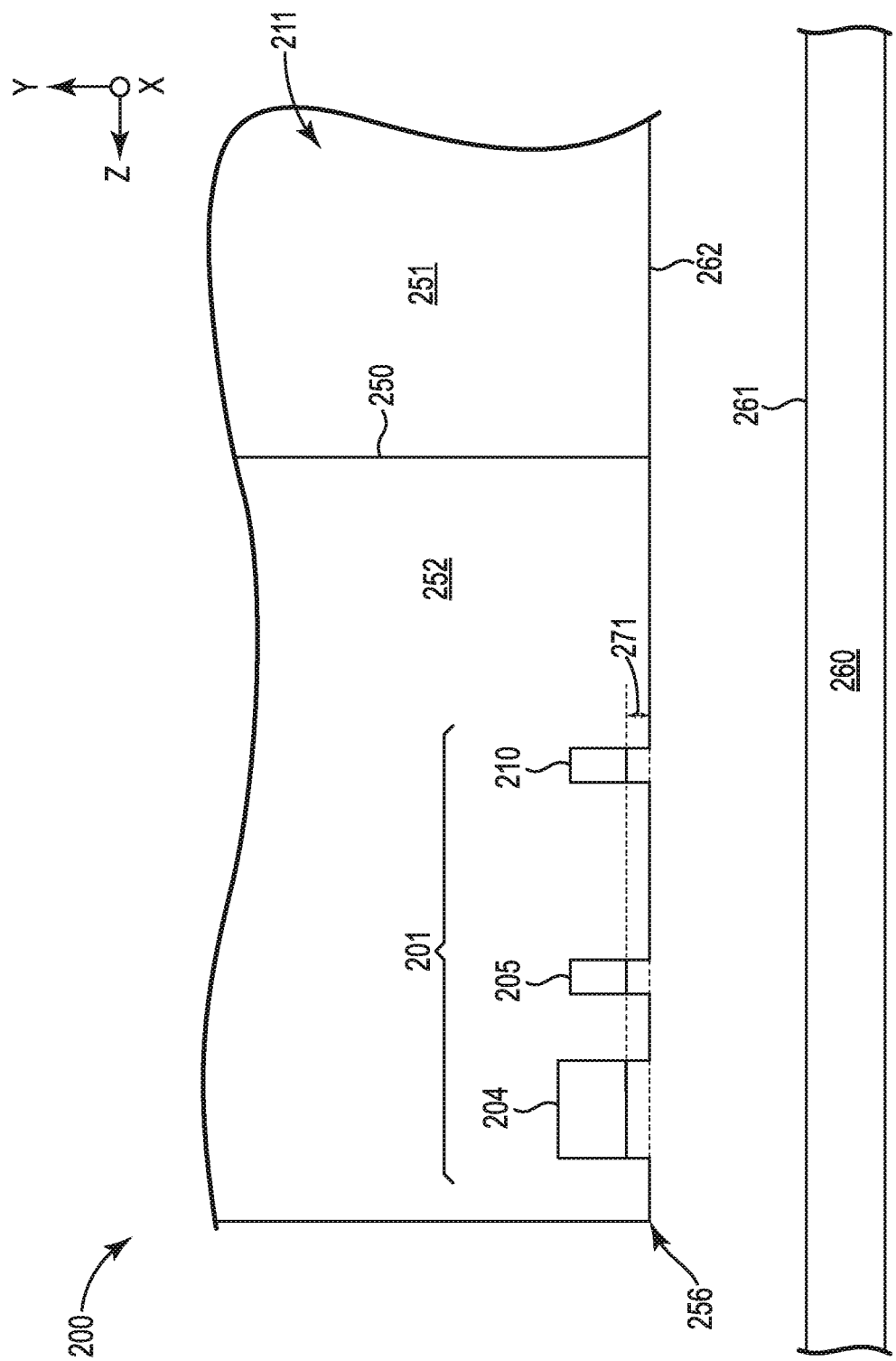
FIG. 2D is a schematic, cross-section of a row bar showing the slider in FIG. 2C after lapping and after the slider has cooled.

If the expansion represented in FIG. 2B is unintentional (e.g., due to frictional heating and/or temperature variation in the surround environment), then the receding surfaces shown in FIG. 2D can cause the clearance during drive operation between an underlying rotating disk media (not shown) and contact pad 204, magnetoresistive writer element 205, and/or magnetoresistive reader element 210 to be different than what is expected, potentially negatively impacting critical drive parameters such as fly height and areal density.

By controlling the temperature of a lapping plate 260 with a temperature control system according to the present disclosure, the temperature of the row bar 211 including the contact pad 204, magnetoresistive writer element 205, and magnetoresistive reader element 210 can be similarly controlled, albeit indirectly through control of the lapping plate temperature, while the row bar 211 is in contact with the lapping plate 260 and undue receding of such elements can be reduced or even eliminated.

In addition, a temperature control system according to the present disclosure can permit controlling the temperature of the lapping plate 260 to different target temperatures so that a desired amount of expansion and recession as shown in FIGS. 2B and 2D can be performed for one specification while a different desired amount of expansion and recession can be performed for a different specification. In this way, a temperature control system according to the present disclosure can function as a process control dial in a single lapping system for different specifications. In one embodiment, different temperatures are used across a fleet of lapping systems to compensate for small hardware differences in lapping pressure. In another embodiment, different temperatures are used on a single lapping system in a manufacturing environment to enable multiple products to use the same lapping system, offering each product the flexibility of maintaining a different contact pad recession target. For example, a first row bar can be lapping while controlling the lapping plate to a first target temperature +/−0.3° C., and a second row bar can be subsequently lapped using the same lapping system and while controlling the temperature of the lapping plate to a second target temperature +/−0.3° C., where the second target temperature is different than the first target temperature.

In some embodiments, the target temperature can be +/−10° C. during at least a portion of the lapping, +/−5° C. during at least a portion of the lapping, +/−1° C. during at least a portion of the lapping, +/−0.5° C. during at least a portion of the lapping, +/−0.3° C. during at least a portion of the lapping, or even +/−0.2° C. during at least a portion of the lapping. The lapping plate can be controlled to such tolerances during all of lapping if desired, even if the ambient temperature (e.g., factory room) varies, for example, +/−5° C. or more.

Figure 1B:
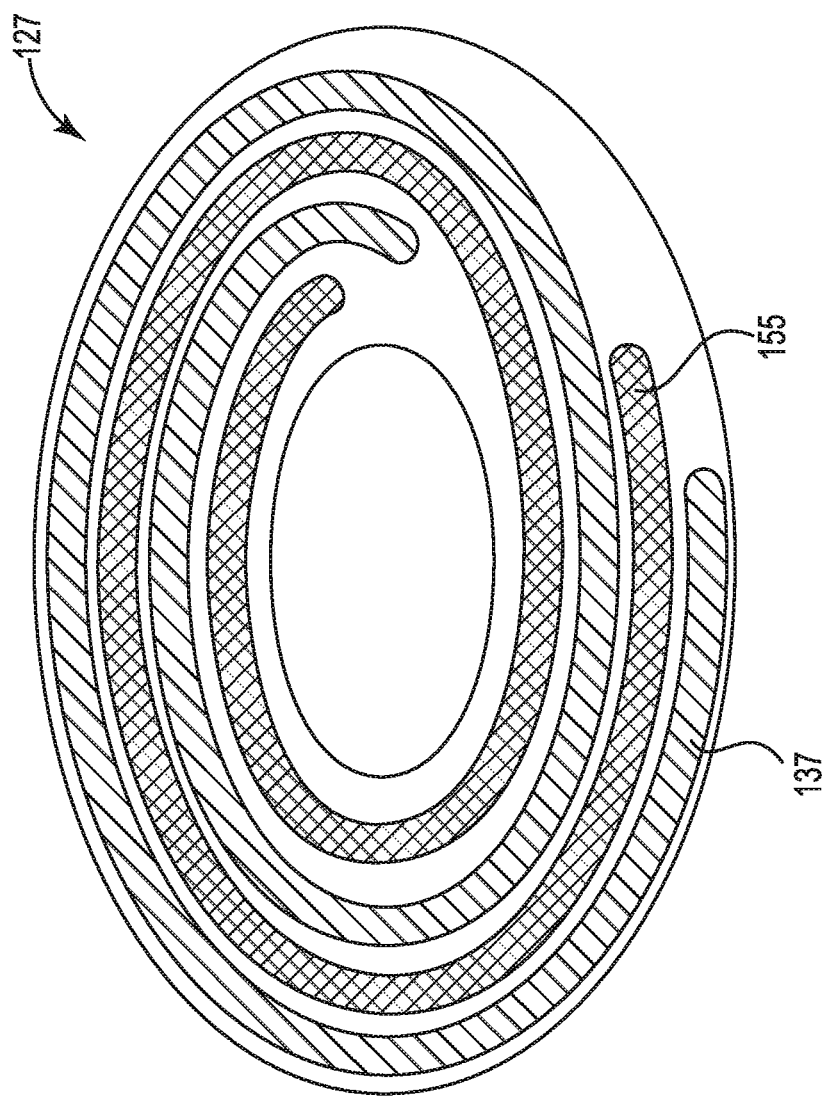
FIG. 1B is a schematic, bottom view of the lapping plate in FIG. 1A.

An example of a temperature control system according to the present disclosure is illustrated in FIGS. 1A and 1B. As shown in FIG. 1A, lapping system 100 includes a temperature control system 160 having a first temperature control system 130 and a second temperature control system 150, which can be used alone or in combination together.

Temperature control system 130 is operatively coupled to the lapping plate 120 and configured to control the temperature of the lapping plate 120 to a target temperature. As shown, temperature control system 130 includes a closed fluid supply system 135 that is coupled to the lapping plate 120 so that heat can transfer to or from the lapping plate 120 to fluid that flows through the closed fluid supply system. As shown, closed fluid supply system 135 includes supply line 136, portion 137 that allows transfer of heat between plate 120 and portion 137, return line 138, and heat exchange device 139 to complete the circuit. In some embodiments, heat exchange device 139 can heat and cool the fluid so as to heat or cool lapping plate 120 as conditions require. In some embodiments, heat exchange device 139 only heats or only cools the fluid.

In some embodiments, portion 137 can form one or more coils and be in thermal contact with the chuck 127 so as to transfer heat to or from lapping plate 120 and provide the desired temperature control. Portion 137 can incorporated with chuck 127 in any manner so as to provide desirable heat transfer properties between plate 120 and portion 137. For example, portion 137 can be mounted to chuck 127 via top and/or bottom surfaces of chuck 127 (e.g., incorporated into recessed surfaces of chuck 127); portion 137 can be incorporated within the body of chuck 127; or, as shown in FIG. 1B, portion 137 can be mounted to and in thermal contact with the bottom surface of chuck 127 so as to transfer heat to or from plate 120 through chuck 127. Portion 137 can be operatively coupled to lines 136 and 138 in any desired manner, e.g., via one or more rotary unions.

In some embodiments, temperature control system 130 can include a chiller 139 as a heat exchange device using a fluid such water or an inhibited glycol (e.g., ethylene or propylene glycol). If desired, an inhibited glycol can be mixed with an amount of water depending on operating conditions.

A chiller 139 can include piping and valves to control the cooling effect of coolant fluid supplied to the lapping plate to transfer heat from the lapping plate to the coolant fluid in the closed circuit system. In some embodiments, chiller 139 can be a system that chills a liquid such as water to a target temperature to achieve a desired temperature at lapping surface 125. For example, thermal modeling shows that water can be chilled to 18° C. and the lapping surface 125 can be controlled to from 25° C. to 18° C.+/−0.3° C. after 10 minutes of circulating the water in a closed system directly beneath a tin lapping plate. Accordingly, since the temperature of the lapping surface 125 can be relatively close to the cooling water (e.g., +/−0.3° C.) the temperature of the lapping surface 125 can be controlled by controlling the temperature of the cooling water to be substantially the same as the target temperature of the lapping surface 125. Alternative coolant fluids can be used, such as a glycol (ethylene glycol, diethylene glycol, or propylene glycol), mixtures of a glycol with water, and the like. Also, higher initial temperatures for the lapping plate 120 (the difference in temperature between the lapping plate 120 and the coolant) can increase the rate of cooling, though may result in increased time to reach the target temperature of lapping surface 125.

As mentioned above, temperature control system 160 can include a second temperature control system 150, alone or in combination with the first temperature control system 130. A second temperature control system 150 can be an electrical heating system that includes one or more electrical resistive heating elements coupled to the chuck 127. The temperature of the lapping plate 120 can be increased by supplying electrical power to the one or more electrical resistive heating elements to increase the temperature of the lapping plate 120. As shown in FIG. 1A, temperature control system 150 includes an electrical heater device 153 having electrical leads 151 and 152. The electrical leads 151 and 152 are electrically coupled to an electrical resistive heater 155 (see FIG. 1B). For example, electrical leads 151 and 152 could be electrically coupled to electrical resistive heater 155 via one or more slip rings. Electrical resistive heater 155 can incorporated with chuck 127 in any manner so as to provide desirable heat transfer properties between plate 120 and electrical resistive heater 155. For example, electrical resistive heater 155 can be mounted to chuck 127 via top and/or bottom surfaces of chuck 127 (e.g., incorporated into recessed surfaces of chuck 127); electrical resistive heater 155 can be incorporated within the body of chuck 127; or, as shown in FIG. 1B, electrical resistive heater 155 can be mounted to and in thermal contact with the bottom surface of chuck 127 so as to transfer heat to or from plate 120 through chuck 127. As shown, the electrical resistive heater 155 coils around on the bottom surface of chuck 127 and is in thermal contact with the bottom surface of chuck 127 so as to transfer heat through chuck 127 to lapping plate 120 and provide the desired temperature control. In one embodiment, the ambient lapping environment could be intentionally set below target plate/bar temperature, allowing the electrical resistive heaters to always be used to heat the lapping plate, and therefore bar, to target temperature. In another embodiment, the temperature of a lapping lubricant or slurry dispensed on the top of the lapping plate could be intentionally set below target plate/bar temperature, allowing the electrical resistive heaters to always be used to heat the lapping plate, and therefore row bar, to target temperature.

A benefit of electrical resistive heaters, whether used alone or with a liquid cooling system, is their relatively fast response time, on the order of 0.1-10 seconds.

As mentioned above, and as shown in FIGS. 1A and 1B, temperature control systems 130 and 150 can be used together. For example, temperature control system 130 could be used to cool lapping plate 120 and temperature control system 150 could be used to heat lapping plate 120 so as to control the temperature of lapping plate 120 to a target temperature within a desired tolerance and within a desired time period. To help control temperature of the lapping plate 120, the temperature of lapping plate 120 can be measured. A variety of techniques can be used to measure the temperature of lapping plate 120. Non limiting examples of temperature sensors include infrared sensors, thermocouple sensors, and combinations thereof. For example, as shown in FIG. 1A, the temperature of top lapping surface 125 can be conveniently measured using an infrared sensor 141, which advantageously does not have to contact the lapping plate 120 and can be positioned as desired. As another example, as shown in FIG. 1A, the temperature of lapping plate sidewall 126 can be measured using thermocouple sensor 142.

A measured temperature signal can be transmitted to a controller, which can process the signal and provide an output to adjust the output of the temperature control system, as desired, to the lapping plate 120. For example, as shown in FIG. 1A, the temperature control system 160 includes a controller 140 in electrical communication with temperature sensors 141 and 142. The controller 140 can receive signals from sensors 141 and 142 during lapping and execute program instructions accordingly. For example, in some embodiments, the controller 140 can control the chiller 139 to adjust the level of cooling provided to lapping plate 120, and control the heater 153 to adjust the level of heating provided to lapping plate 120.

What is claimed is:
1. A method of lapping a slider or row bar having a plurality of sliders, wherein the method comprises:
 a) lapping the slider or the row bar having a plurality of sliders by contacting a surface of the slider or row bar having a plurality of sliders with a rotating lapping plate, wherein the slider comprises one or more electronic lapping guides or wherein each of the plurality of sliders comprises one or more electronic lapping guides;
 b) controlling the temperature of the lapping plate to a target temperature +/−0.3° C. during at least a portion of the lapping, wherein controlling comprises:
  i) measuring a surface of the lapping plate that faces the surface of the slider or row bar having a plurality of sliders during lapping, wherein the temperature of the surface of the lapping plate that faces the surface of the slider or row bar is measured via a temperature sensor comprising an infrared sensor; and
ii) providing the measured temperature of the surface of the lapping plate to a control system that controls the temperature of the lapping plate.

2. The method of claim 1, wherein the row bar is a first row bar and the target temperatures is a first target temperature +/−0.3° C., and further comprising:
a) lapping a second row bar having a plurality of sliders by contacting a surface of the second row bar having a plurality of sliders with the rotating lapping plate, wherein each of the plurality of sliders comprises one or more electronic lapping guides;
b) controlling the temperature of the lapping plate to a second target temperature +/−0.3° C. during at least a portion of the lapping, wherein the second target temperature is different than the first target temperature.

3. The method of claim 1, wherein controlling comprises supplying a flow of temperature-controlled fluid to the lapping plate via a closed fluid supply system, wherein the fluid is supplied at a temperature so that the temperature of the lapping plate is controlled to the target temperature +/−0.3° C. during at least a portion of the lapping.

4. The method of claim 3, wherein the fluid is heated or cooled to control the temperature of the fluid supplied to the lapping plate to control the temperature of the lapping plate.

5. The method of claim 4, further comprising one or more electrical resistive heating elements coupled to the lapping plate, wherein the fluid is cooled to lower the temperature of the fluid to lower the temperature of the lapping plate or the temperature of the lapping plate is increased by supplying electrical power to the one or more electrical resistive heating elements to increase the temperature of the lapping plate.

6. The method of claim 1, wherein the lapping plate is made of material chosen from tin, tin alloy, aluminum, copper, combinations thereof.

7. The method of claim 1, wherein the temperature sensor further comprises a thermocouple sensor.

8. A lapping system comprising:
a) a mounting structure that is configured to removably couple a row bar comprising a plurality of sliders, wherein each of the plurality of sliders comprises one or more electronic lapping guides;
b) a lapping plate having a lapping surface that is operable to rotate and contact the row bar for lapping each slider; and
c) a temperature control system operatively coupled to the lapping plate and configured to control the temperature of the lapping plate to a target temperature +/−0.3° C. during at least a portion of the lapping, wherein the temperature control system comprises:
i) a temperature sensor comprising an infrared sensor; and
ii) a controller that is configured to execute program instructions comprising:
A measuring a surface of the lapping plate that faces the surface of the row bar having a plurality of sliders during lapping, wherein the temperature of the surface of the lapping plate that faces the surface of the row bar is measured via the infrared sensor; and
B) providing the measured temperature of the surface of the lapping plate to the controller to adjust the temperature of the lapping plate.

9. The lapping system of claim 8, wherein the temperature is made of material chosen from tin, tin alloy, aluminum, copper, combinations thereof.

10. The lapping system of claim 8, wherein the temperature control system comprises a closed fluid supply system that is coupled to the lapping plate so that heat transfers to the lapping plate from fluid or from the lapping plate to fluid, when fluid flows through the closed fluid supply system.

11. The lapping system of claim 10, wherein the temperature control system is operative to heat or cool the fluid to control the temperature of the fluid supplied to the lapping plate to control the temperature of the lapping plate.

12. The lapping system of claim 11, further comprising one or more electrical resistive heating elements coupled to the lapping plate, wherein the temperature control system is operative to cool the fluid to lower the temperature of the fluid to lower the temperature of the lapping plate and the temperature control system is operative to heat the lapping plate by supplying electrical power to the one or more electrical resistive heating elements to increase the temperature of the lapping plate.

13. The lapping system of claim 8, wherein the temperature control system comprises one or more electrical resistive heating elements coupled to the lapping plate, wherein the temperature control system is operative to heat the lapping plate by supplying electrical power to the one or more electrical resistive heating elements to increase the temperature of the lapping plate.

14. The lapping system of claim 8, wherein the temperature sensor further comprises a thermocouple sensor.

15. The lapping system of claim 8, wherein the lapping plate has a thermal conductivity of 10 W/(m*K) or more.

16. The system of claim 8, wherein the mounting structure comprises;
a) an arm structure; and
b) a carrier removably attached to the arm structure, wherein the row bar is removably attached to the carrier.

17. A lapping system comprising:
a) a mounting structure that is configured to removably couple a row bar comprising a plurality of sliders, wherein each of the plurality of sliders comprises one or more electronic lapping guides,
b) a lapping plate having a lapping surface that is operable to rotate and contact the row bar for lapping each slider; and
c) a temperature control system operatively coupled to the lapping plate and configured to control the temperature of the lapping plate to a target temperature +/−0.3° C. during at least a portion of the lapping, wherein the temperature control system comprises:
i) a temperature sensor comprising an infrared sensor;
ii) a controller that is configured to execute program instructions comprising:
A) measuring a surface of the lapping plate that faces the surface of the row bar having a plurality of sliders during lapping, wherein the temperature of the surface of the lapping plate that faces the surface of the row bar is measured via the infrared sensor; and
B) providing the measured temperature of the surface of the lapping plate to the controller to adjust the temperature of the lapping plate; and
iii) one or more electrical resistive heating elements coupled to the lapping plate, wherein the temperature control system is operative to heat the lapping plate by supplying electrical power to the one or more electrical resistive heating elements to increase the temperature of the lapping plate.

18. A lapping system comprising:
a) a mounting structure that is configured to removably couple a row bar comprising a plurality of sliders, wherein each of the plurality of sliders comprises one or more electronic lapping guides,
b) a lapping plate having a lapping surface that is operable to rotate and contact the row bar for lapping each slider; and
c) a temperature control system operatively coupled to the lapping plate and configured to control the temperature of the lapping plate to a target temperature +/−0.3° C. during at least a portion of the lapping, wherein the temperature control system comprises:
  i) a temperature sensor comprising an infrared sensor;
  ii) a controller that is configured to execute program instructions comprising:
    A) measuring a surface of the lapping plate that faces the surface of the row bar having a plurality of sliders during lapping, wherein the temperature of the surface of the lapping plate that faces the surface of the row bar is measured via the infrared sensor; and
    B) providing the measured temperature of the surface of the lapping plate to the controller to adjust the temperature of the lapping plate; and
  iii) a closed fluid supply system that is coupled to the lapping plate so that heat transfers to the lapping plate from fluid or from the lapping plate to fluid, when fluid flows through the closed fluid supply system, to control the surface of the lapping plate that faces the surface of the row bar having a plurality of sliders during lapping.

19. The lapping system of claim 18, wherein the temperature control system is operative to cool the fluid to lower the temperature of the fluid to lower the temperature of the surface of the lapping plate that faces the surface of the row bar having a plurality of sliders during lapping, and wherein the temperature control system is operative to heat the fluid to increase the temperature of the fluid to increase the temperature of the surface of the lapping plate that faces the surface of the row bar having a plurality of sliders during lapping.

* * * * *